United States Patent

Meyers et al.

[11] 4,006,966
[45] Feb. 8, 1977

[54] PROCESS FOR PREPARATION OF AN ELECTRODE STRUCTURE CONTAINING $WO_3$ USE OF THE STRUCTURE IN AN ELECTROCHROMIC CELL

[75] Inventors: Marion Douglas Meyers, Stamford, Conn.; Henry Patrick Landi, Yorktown Heights, N.Y.

[73] Assignee: American Cyanamid Company, Stamford, Conn.

[22] Filed: Apr. 4, 1975

[21] Appl. No.: 565,307

Related U.S. Application Data

[60] Continuation of Ser. No. 392,165, Aug. 27, 1973, abandoned, which is a division of Ser. No. 105,882, Jan. 12, 1971, abandoned.

[52] U.S. Cl. .......................... 350/160 R; 252/62.2; 429/188
[51] Int. Cl.² ................................................ G02F 1/36
[58] Field of Search ............... 350/160 R; 136/153, 136/157; 252/62.2

[56] References Cited

UNITED STATES PATENTS

| | | | |
|---|---|---|---|
| 3,521,941 | 7/1970 | Deb | 350/160 R |
| 3,541,124 | 11/1970 | Owens | 252/62.2 X |
| 3,879,108 | 4/1975 | Berets | 350/160 R |

OTHER PUBLICATIONS

Chemical Abstracts 74:134189e; 74:134190y; 74:134191z; 71:9125t and 71:97760z. Refer to dates of items abstracted.

*Primary Examiner*—Robert J. Webster
*Attorney, Agent, or Firm*—Charles J. Fickey; Robert J. Feltovic

[57] ABSTRACT

A counter electrode structure of a transition metal electrochromic compound for use in an electro-optical device, which is useful in control of visible and infrared absorption by windows, in data display devices and the like, typically comprising in sandwich arrangement a pair of electrodes, and disposed therebetween, a layer of transition metal electrochromic compounds and a semi-solid highly conductive sulfuric acid gel electrolyte, one of the electrodes being said counter electrode. The gel exhibits good conductivity, stability and compatibility with the electrochromic layers. The present counter electrode is more efficient and has a longer lifetime.

6 Claims, 4 Drawing Figures

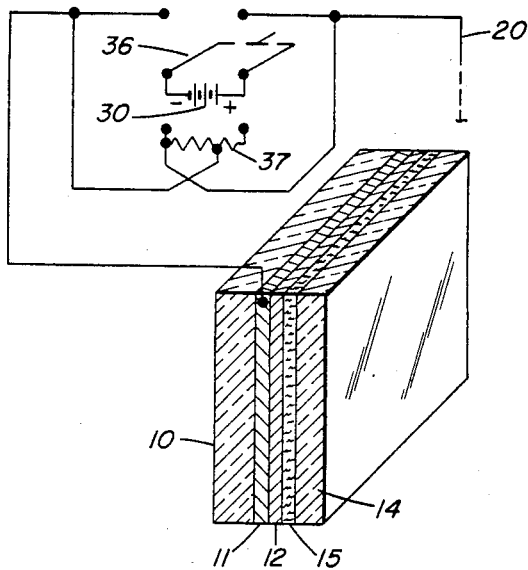
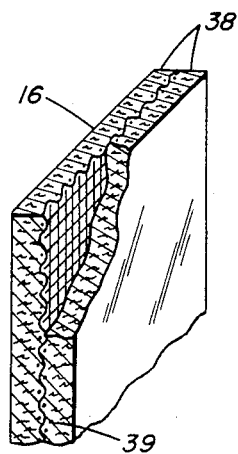
FIG. 1
FIG. 4
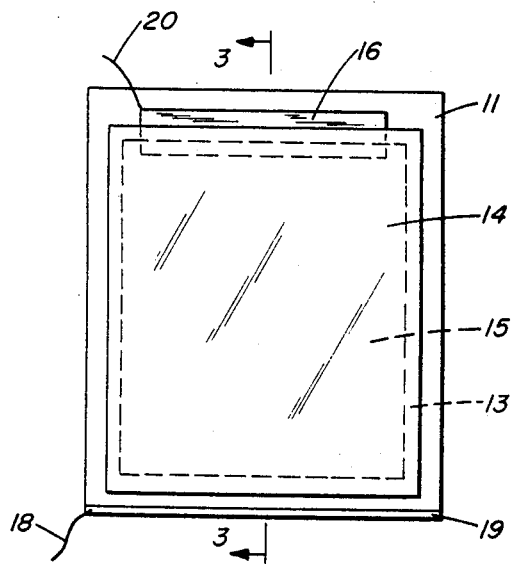
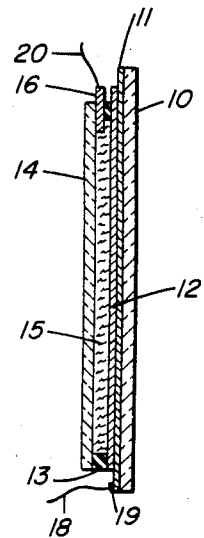
FIG. 2
FIG. 3

PROCESS FOR PREPARATION OF AN ELECTRODE STRUCTURE CONTAINING WO₃ USE OF THE STRUCTURE IN AN ELECTROCHROMIC CELL

This application is a continuation of application Ser. No. 392,165, filed Aug. 27, 1973, now abandoned, which in turn is a division of application Ser. No. 105,882, filed Jan. 12, 1971, now abandoned.

BACKGROUND OF THE INVENTION

This invention is directed to electro-optical devices whose electromagnetic radiation transmission characteristics can be selectively altered by the influence of a suitably controlled electrical field. More particularly this device relates to a system comprising electrochromic materials and conductive electrolyte which exhibit good chemical and electrochemical stability, reversibility and reproducibility. Still more particularly this invention is concerned with an improved counter electrode structure, which is a division of our Application Ser. No. 105,882, filed Jan. 12, 1971, both now abandoned.

In prior U.S. Applications, Ser. No. 530,086, filed Feb. 25, 1966, abandoned and refiled as Ser. No. 616,791, Feb. 17, 1967; abandoned and refiled as Ser. No. 110,068, Jan. 27, 1971; abandoned and refiled as Ser. No. 348,878, Mar. 10, 1973, now U.S. Pat. No. 3,829,196, and Ser. No. 534,188, filed Mar. 14, 1966, now abandoned and refiled as Ser. No. 120,365, Mar. 2, 1971, abandoned and refiled as Ser. No. 315,966, Dec. 18, 1972, abandoned and refiled as Ser. No. 509,578, Sept. 26, 1974, now pending, and U.S. Pat. No. 3,521,941, there are described electro-optical devices exhibiting a phenomenon known as persistent electrochromism.

The term persistent electrochromism denotes the property of a material whereby its electromagnetic radiation absorption characteristic is altered, in most instances even at ambient temperature, under the influence of an electric field. Such materials, for example, may exhibit little or no absorption of visible wave lengths in the absence of an electric field and therefore be transparent, but when subjected to an electric field, effectively absorb in the red end of the spectrum, turning blue in color. Similar effects can be observed in other portions of the electromagnetic radiation spectrum, invisible as well as visible.

As described in the foregoing earlier applications, if a layer of a persistent electrochromic material is disposed between a pair of electrodes, across which a potential is applied, the radiation transmitting characteristic of the material will change. If the electrodes and the electrochromic layer are formed on the surface of transparent substrate, such as glass, the light transmitting characteristics of the combination can be varied by controlling the electric field produced across the electrochromic material. On the substrate which originally is clear, i.e., presenting substantially no diminution of the light transmitting ability of the substrate, application of a voltage between the electrodes to establish an electric field of the proper polarity changes the light absorption characteristic of the electrochromic material, turning it darker, for example, thus decreasing the light transmitting ability of the entire assembly.

In copending, commonly assigned application, Ser. No. 41,154, filed May 25, 1970 abandoned and refiled Apr. 13, 1972, now pending, is described the use of a large number of suitable metallic counter-electrodes. It has now been found that a very effective counter electrode structure is formed by the use of layers of plasticized persistent electrochromic material pressed onto each side of a metal screen.

It is therefore an object of this invention to provide a more effective counter electrode for an electrochromic cell.

This and other objects of the invention will become apparent as the description thereof proceeds.

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

DETAILED DESCRIPTION OF THE INVENTION

Electrochromic Materials

The materials which form the electrochromic materials of the device in general are electrical insulators or semi-conductors. Thus are excluded those metals, metal alloys, and other metal-containing compounds which are relatively good electrical conductors.

While not wholly understood, it appears that coloration of the electrochromic materials must be accompanied by the uptake of positive counterions provided in the electrolyte.

The persistent electrochromic materials are further characterized as inorganic substances which are solid under the conditions of use, whether as pure elements, alloys, or chemical compounds, containing at least one element of the Periodic System which can exist in more than one oxidation state in addition to zero. The term "oxidation state" as employed herein is defined in "Inorganic Chemistry," T. Moeller, John Wiley & Sons, Inc., New York, 1952. These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfide of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides (M representing the metal ion), e.g., MnO, NiO, CoO, etc.: $M_2O_3$ oxides, e.g., $Cr_2O_3$, $Fe_2O_3$, $Y_2O_3$, $Yb_2O_3$, $V_2O_4$, $Ti_2O_3$, $Mn_2O_3$, etc.; $MO_2$ oxides, e.g., $TiO_2$, $MnO_2$, $ThO_2$, $CrO_2$, etc.; $M_3O_4$ oxides, e.g., $CO_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$, etc.; $M_4O_6$ oxides; $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$ ("Niobite" oxides); $X_2Y_2O_6$, e.g., $Na_2Nb_2O_6$: Spinel structure oxides, i.e., of the formula $X_2YO_4$, e.g., $NaMoO_4$, $Ag_2MoO_4$, $Cu_2MoO_4$, $Li_2MoO_4$, $Li_2WO_4$, $Sr_2TiO_4$, $Ca_2MnO_4$, etc.; and $XY_2O_4$, e.g.; $FeCr_2O_4$, $TiZn_2O_4$, etc.; $X_2YO_5$ oxides, e.g., $Fe_2TiO_5$, $Al_2TiO_5$, etc. For a discussion of some complex oxides, see Advanced Inorganic Chemistry, Cotten & Wilkinson, p. 51, (1966). Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3.H_2O$, $WO_3.2H_2O$, $MoO_3.H_2O$ and $MoO_3.2H_2O$.

The preferred electrochromic material for use with the liquid electrolyte of the present invention is a compound which contains at least one element selected from Group VA, VIA, VIIA of the Periodic Table of the elements and at least one cation from Groups IB, IIB to VIIIB including Lanthanide and Actinide series. Particularly advantageous materials are $WO_3$ AND $MoO_3$.

An important advantage of devices of the invention containing a stable sulfuric acid gel electrolyte in contact with electrochromic material is applicability to large uniformly colored areas. The invention, therefore, permits numerous practical applications where control of visible and infrared absorption is desired to which prior art electrooptical devices are not susceptible as for example windows in homes, commercial buildings and automobiles.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optimum thickness will also be determined by the nature of the particular compound being laid down as films and by the film-forming method since the particular compound and film-forming method may place physical (e.g., non-uniform film surface) and economic limitations on manufacture of the devices.

The films may be laid down on any substrate which, relative to the film, is electrically non-conducting. Suitable substrate materials include glass, wood, paper, plastics, plaster, and the like, including transparent, translucent, opaque or other optical quality materials. A preferred embodiment in the instant device would employ at least one transparent electrode.

When the electric field is applied between the electrodes, a blue coloration of the previously transparent sandwich occurs, i.e., the persistent electrochromic layer becomes absorptive of electromagnetic radiation over a band encompassing the red end of the visible spectrum, thereby rendering it bluish in apperance. Prior to the application of the electric field, it was essentially non-absorbent and thus transparent.

ELECTROLYTE

A semi-solid conductive electrolyte gel is employed. The electrolyte comprises in combination with sulfuric acid a gelling material for the acid. Any gelling agent which is compatible with the electrochromic layer is suitable. Particularly advantageous gelling agents are polyvinyl alcohol, polyacrylamide, ethylene glycol, sodium silicate, cabo-sil, and the like.

A thickening agent such as Purifloc A21 may optionally be employed.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby gel electrolytes can be produced to give a specific conductivity in the range of from about 0.10 to 0.60 ohm$^-$ cm$^{-1}$.

A distinct advantage of the above mentioned gel electrolytes is their high ionic conductivity and good chemical stability. We have found that both requirements are unexpectedly met by gels in the preferred conductivity range of 0.20 – 0.40 ohm$^{-1}$ cm$^{-1}$.

Other materials may be incorporated into the gel to vary the physical properties of the gel such as viscosity and vapor pressure. Thus the composition may optionally include organic solvents such as, dimethyl formamide, acetonitrile, proprionitrile, butyrolactone and glycerine.

Further, the gels used in the instant invention may be made opaque with, for example, polyhydric phenols such as gallic acid for use in certain electrochromic display device applications. Acids and acid salts may also be used as electrolytes as disclosed in copending, commonly assigned application Ser. No. 41,154, filed May 25, 1970, abandoned and refiled Apr. 13, 1972, now pending.

COUNTER ELECTRODE

If the cell is to be used as a light transmission modulating device, it employs at least one transparent electrode and a second counter electrode in contact with the solution. The latter electrode is one selected from a group of materials compatible with the electrolyte, as previously discussed, such as tungsten oxide or molybdenum oxide. It is advantageous to use the same material for both electrodes, although not necessary. The counter electrode structure of the present invention is formed from a mixture of an electrochromic, material as previously described, and a binder, such as unsintered, fibrillated polyfluoroalkylenes, e.g. polytetrafluoroethylene, polyhexafluoropropylene, and the like, and copolymers thereof. The mixture also includes an electrically conductive material such as graphite and may include other polymeric materials such as polymethylmethacrylate and plasticizers therefor such as dicyclohexylphthlate. The mixture is blended on a heated mill and calendered into thin sheets. Two such sheets are then used with a metal screen between to form the final electrode structure. To do this, the layered structure is pressed under elevated temperature and pressure between metal pressure plates, for a short time, with cooling prior to pressure release. The plasticized polymethylmethacrylate is then extracted with acetone solvent, followed by water washing and drying. The finished structure forms a very effective and durable counter electrode for electrochromic cells.

The invention may be better understood by reference to the drawings which show embodiments of the invention.

FIG. 1 is a cross-sectional view in part of an electrochromic device of the invention, showing the connecting electrical power circuit, FIG. 2 is a plan view of the device of FIG. 1, FIG. 3 is a cross-sectional view of taken along the lines 3—3 of FIG. 2, showing the complete device of FIG. 1, FIG. 4 is a view with parts broken away of the counter electrodes of the invention.

With reference to FIG. 1, 10 is a substrate or backing material overlaid with a first electrode 11. The substrate 10 and the conductive layer 11 may conveniently be provided as a unit by so-called "NESA"-glass, a commercially available product having a transparent coating of conductive layer 11, or other transparent material such as NESA glass, is deposited a layer of a persistent electrochromic material 12 for example by vacuum evaporating tungsten oxide to form a film 12 of thickness in the range of about one micron. Overlaying and in contact with film 12 is a gasket 13 formed from an electrically insulating material. As shown in FIGS. 2 and 3 the gasket 13 separates the film 12 from a glass cover plate 14 and produces a space for the gel electrolyte 15. In the end of the electrolyte chamber is the tungsten oxide counter electrode 16 of the present invention.

Contact to an external potential is secured by lead 18 from a conductive strip 19 over the tin oxide layer 11 of the conducting glass, and lead 20 to counter electrode 16. A source of dc potential 30 is coupled between the conductive films with its positive terminal connected to the metallic strip 19 and its negative terminal connected to the tungsten oxide counter electrode 16.

Turning now to drawing, FIG. 4 a more detailed view of counter electrode 16 is shown. The counter electrode consists of a screen or expanded metal layer 39, with a layer 38 of an electrochromic material pressed onto each side as previously described.

The following examples illustrating particular applications of the present invention are not to be construed as a limitation of the invention except as defined in the appended claims.

EXAMPLE I

Procedure for the Preparation of This Electrode Structure:

The following materials were blended for 5 minutes on a standard rubber mill pre-heated to 100°–110° C., causing complete fibrillation of the polytetrafluoroethylene (PTFE) component:

39.5 wt % polymethylmethacrylate bead polymer (American Cyanamid Company BM 131)

26.3 wt % dicyclohexylphthalate plasticizer (Allied Elastex DCHP)

24.3 wt % graphite (99+% carbon) (American Cyanamid Company)

8.1 wt % tungstic ocise (Alfa Inorganics)

1.1 wt % polytetrafluorethylene (PTFE) in the form of a colloidal dispersion in water (du Pont 30B suspension — 60% solids)

0.7 wt % polyhexafluoropropylene tetrafluoroethylene copolymer (FEP) in the form of a micropulverized powder (Liquid Nitrogen — FEP No. 160)

The above blend (totaling 1500 grams) was removed from the mill in the form of a calendered sheet approximately ⅛ inch thick and cut into rectangular pieces weighing 38 grams. Each piece was then compressed into sheets measuring 0.030 inch + 6 inches × 8 inches.

Two of the above sheets were then compressed into an expanded tantalum metal current collector (Die Mesh 5 Ta 7 − 0.078 inch) one on either side of the expanded metal between chrome plated metal pressure plates.

The above assemble was compressed 3 minutes at 275° F (135° C) and 1500 psi pressure and then cooled under pressure before releasing. During this compression, the electrode forming sheets flow together through the open spaces in the current collector screen.

The formed structure described above was then placed in a tank where the plasticized PMMA phase was completely extracted and washed with acetone solvent. It was then washed several times with deionized water and dried by rolling under pressure between blotter paper.

EXAMPLE II

The procedure of Example I was followed, except for substitution of molybdenum oxide for tungstic oxide, to make another electrode.

EXAMPLE III

A $WO_3$-filled electrode as prepared in Example I were employed in an electrochromic cell having an ethylene glycol-$H_2SO_4$ electrolyte having $WO_3$ deposited on NESA glass as the optical material and did not deteriorate in the electrolyte for at least eight months. With repeated coloring and bleaching of the optical layer the electrode functioned after environmental testing at −40° F and 180° F.

We claim:

1. In a variable light modulating device comprising a layer of persistent electrochromic material as a light modulating material, a counter-electrode, an electrolyte material in contact with said light modulating material and said counter-electrode, the improvement being a counter-electrode comprising a sheet of an admixture of a persistent electrochromic material, a fibrillated plastic binder and an electrically conductive material pressed onto a planar electrically conductive support.

2. The variable light transmission device of claim 1 wherein said counter-electrode is a structure comprising a layer of persistent electrochromic material in a fibrillated plastic binder pressed onto each side of a planar electrically conductive metal grid.

3. The variable light transmission device of claim 2 wherein the counter-electrode persistent electrochromic material is tungsten oxide and the metal grid is a tantalum grid.

4. An electrode structure for an electrochromic light modulating device, said electrode comprising a planar electrically conductive metal grid having a solid layer pressed onto each side, said layer comprising a mixture of a solid, persistent electrochromic material, a fibrillated polymer, and an electrically conductive form of carbon, said layers being heat-pressed onto said grid.

5. The electrode structure of claim 4 wherein said fibrillated polymer is a polyfluoroalkylene compound.

6. The electrode structure of claim 5 wherein said polyfluoroalkylene is at least one member of the group consisting of polytetrafluorethylene, polyhexafluoropropylene, and copolymers thereof.

* * * * *